US011292621B2

(12) United States Patent
Dula

(10) Patent No.: US 11,292,621 B2
(45) Date of Patent: Apr. 5, 2022

(54) SPACECRAFT ONBOARD EQUIPMENT AND PAYLOAD STORAGE SYSTEM

(71) Applicant: Excalibur Almaz USA Inc., Houston, TX (US)

(72) Inventor: Arthur M Dula, Houston, TX (US)

(73) Assignee: Excalibur Almaz USA Inc., Houston, TX (US)

(*) Notice: Subject to any disclaimer, the term of this patent is extended or adjusted under 35 U.S.C. 154(b) by 195 days.

(21) Appl. No.: 15/931,836

(22) Filed: May 14, 2020

(65) Prior Publication Data

US 2020/0361642 A1 Nov. 19, 2020

Related U.S. Application Data

(60) Provisional application No. 62/848,218, filed on May 15, 2019.

(51) Int. Cl.
*B64G 1/66* (2006.01)
*B64G 4/00* (2006.01)
*B64G 1/42* (2006.01)

(52) U.S. Cl.
CPC .............. *B64G 1/66* (2013.01); *B64G 1/42* (2013.01); *B64G 2004/005* (2013.01)

(58) Field of Classification Search
CPC ...... B64G 1/66; B64G 1/42; B64G 2004/005; B64G 1/12; B64G 1/58; B64G 1/62; B64G 1/425; B64G 1/428; B64G 2001/1092; B64G 1/10
See application file for complete search history.

(56) References Cited

U.S. PATENT DOCUMENTS

| 9,718,565 | B1 * | 8/2017 | Lim | B64G 1/641 |
| 9,994,336 | B1 * | 6/2018 | Ghassemieh | B64G 1/00 |
| 2011/0139936 | A1 * | 6/2011 | Allen | B64G 1/222 244/158.2 |
| 2012/0012711 | A1 * | 1/2012 | Ross | B64G 1/641 244/158.2 |
| 2014/0027577 | A1 * | 1/2014 | Darooka | B64G 1/641 244/165 |
| 2021/0086918 | A1 * | 3/2021 | Weintraub | B64G 1/641 |

* cited by examiner

*Primary Examiner* — Valentina Xavier
(74) *Attorney, Agent, or Firm* — Arthur M. Dula

(57) ABSTRACT

A spacecraft onboard equipment and payload storage system comprising a spacecraft having an interior volume, wherein said interior volume comprises a interior annular portion; a annular storage support track connected to said spacecraft within said spacecraft's interior annular portion; and at least one storage module that is movably connected to said annular storage support track.

20 Claims, 4 Drawing Sheets

SPACECRAFT ONBOARD EQUIPMENT AND PAYLOAD STORAGE SYSTEM

CROSS REFERENCE TO RELATED APPLICATIONS

The present application claims the benefit provisional applications No. 62/848,218 filed on May 15, 2019.

STATEMENT REGARDING FEDERALLY SPONSORED RESEARCH OR DEVELOPMENT

The invention is not the product of federally sponsored research or development by NASA or any U.S. federal agency.

FIELD OF THE INVENTION

The invention relates generally to spacecraft onboard storage. Specifically, the invention relates to modular moveable storage systems located within annular base of a space capsule. Still more specifically, the invention relates to a storage system whose modules may be moved on and around an annular track inside the base of a space capsule to allow diverse items including spacecraft equipment and returnable or deployable payloads to be quickly easily loaded and unloaded through the capsule's hatch and also conveniently accessed during spaceflight by an astronaut's hands or a robotic manipulator.

BACKGROUND OF INVENTION

All spacecraft, including reusable space capsules that go into space and then return to the Earth's surface to be refurbished and reused, must carry both onboard spacecraft equipment required for the spacecraft's operation and payloads items of diverse types and sizes; for example, microgravity experiments and deployable units such a cubesats and other satellites. The spacecraft must structurally contain these diverse items and also provide services such as mechanical deployment, electric power, and data network access. Present storage systems are not well suited for conveniently loading, unloading and accessing diverse onboard items because the current state of the art teaches using dedicated storage lockers inside the main volume of the spacecraft for use by astronauts or individually designed mechanical bus systems for unmanned space activities. These fixed lockers and payload buses often require a substantial amount of the spacecraft's internal usable volume. Examples of current storage locker systems include mid deck experiment lockers that were used onboard the US space shuttle, the metal lockers on the SpaceX Dragon reusable space capsule, and the equipment and payload lockers on the JAXA Japanese, ESA European and Orbital Sciences US disposable ISS cargo transportation systems. Access to current spacecraft storage lockers for loading, unloading and use in space (in the case of crewed flight) can be inconvenient because a required item may be in a locker distant from the hatch of the spacecraft or not easily accessible to the hands of an astronaut. These difficulties increase in space capsules used for atmospheric reentry because such capsules are small and if the spacecraft is crewed by astronauts wearing spacesuits that impose ergometric limitations. A spacesuit, especially when pressurized, significantly reduces an astronaut's ability to move, reach and manipulate items within a small space capsule. Current storage lockers can require significant time to load and unload.

OBJECT OF INVENTION

An object of the invention is to provide spacecraft onboard equipment and payload storage for a diverse inventory of relatively small items that permits any required item to be loaded into the spacecraft quickly, be retrieved during flight for use or deployment and unloaded quickly from outside the spacecraft after its return to the Earth's surface.

Another object of the invention is to provide a space capsule storage apparatus that permits fast loading and unloading of diverse items in modules from outside the main hatch of the space capsule.

Yet another object of the invention is to provide a space capsule onboard storage system that makes effective use of the annular volume of a space capsule between the capsule's base and sidewall; thereby allowing the interior volume of the space capsule to be available for other uses.

A specific object of the invention is to provide a storage system that can carry and access a large number of small microgravity experiments and deployable satellite payloads.

Further objects of the invention include providing a spacecraft onboard equipment and payload storage system that is structurally, mechanically and operationally robust enough to be operated either by astronauts or robotic manipulators, is simple to operate, can accommodate a variety of modular containers, is capable of storing and accessing both returnable and deployable payloads, is inexpensive to build and modify and is easy to repair and replace during spacecraft refurbishment between flights.

SUMMARY OF INVENTION

An equipment storage system for use in a spacecraft having a base and an annular wall connected to said base defining a volume, said volume having an interior annular portion comprising: at least one track rail connected to the spacecraft within the annular portion of the spacecraft interior volume near the wall, said track being connected said spacecraft and also connected to at least one removable payload module moveably mounted on said track. An embodiment can include locking means to secure the modules on the track so they will not move during the spacecraft's take-off and landing. An embodiment may include wired or wireless electric power and data bus connections for the modules and their contents. An embodiment may carry a large number of small experiments that are difficult to manage using current state of the art space equipment storage systems. An embodiment may also carry a mix or returnable and deployable items.

DETAILED DESCRIPTION OF THE INVENTION

Spacecraft 100 is a space capsule designed for atmospheric reentry from low Earth orbit (LEO). Examples of this type of spacecraft include the U.S. Mercury, Gemini and Apollo and Dragon capsules; the USSR's Soyuz and Almaz capsules; and the PRC's Shenzhou capsule. These capsules are reentry vehicles that have an internal conical volume of circular cross section; said volume being a limited by a circular thermal protective system at the base of the capsule that is attached to an annular load bearing wall, as will be described in greater detail below. The embodiment of the present invention in this detailed description is shown within an Almaz Reusable Reentry Vehicle (Almaz RRV) designed and built by the Joint Stock Company, Military Industrial Corporation, Scientific Production Organization, Mashinostroyenia, whose address is 33 Gagarina Street, Reutov, 143966, Russian Federation (NPOM). Although the Almaz RRV is shown for illustration of an embodiment, an embodiment of the present invention may be compatible with any space capsule.

Figure 1:
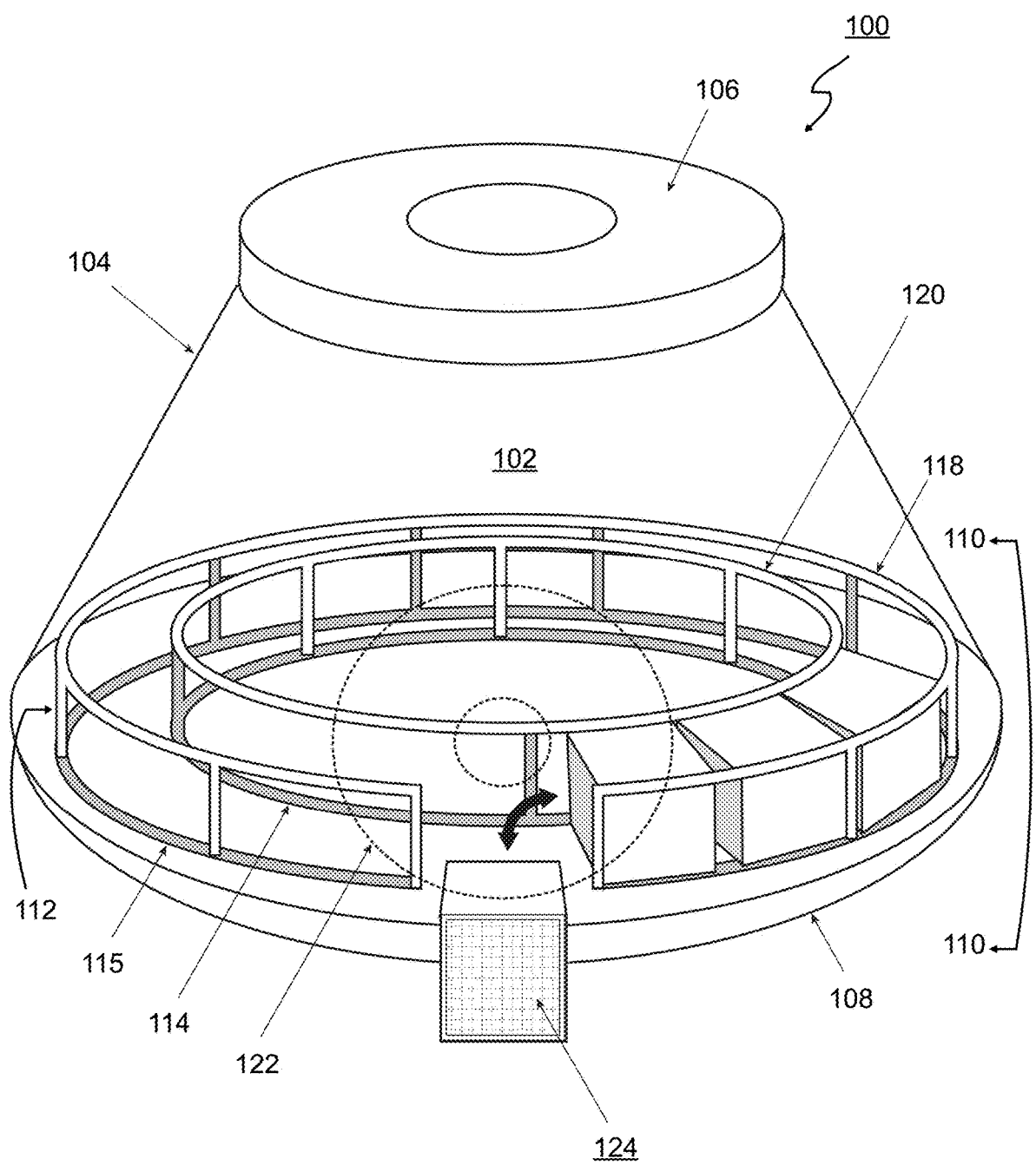
FIG. 1 is an isometric view of an embodiment of the invention within a space capsule spacecraft of the Almaz RRV type.

In FIG. 1, spacecraft Almaz RRV 100 has approximately conical useful interior volume 102. Volume 102 is bounded by forward circular bulkhead 106 that is mechanically connected along its outer edge to one end of load bearing wall 104. The other end of wall 104 is mechanically connected to aft circular base 108, which contains the thermal protective system of the spacecraft and is mechanically strong. Base 108 has a larger diameter than bulkhead 104, so interior volume 102 is a truncated cone that has an acute angle annular portion shown by section lines 110-110 between wall 104 and base 108. Annular storage support track 112 is within annular portion 110 and is shown in this specific embodiment of the invention as having four rails: 114 (lower inboard), 116 (lower outboard), 118 (upper outboard) and 120 (upper inboard). Track 112 is connected to wall 104 and/or base 108 by welding, bolts, rivets, adhesive or any other suitable fastening means, which are well known to those skilled in the art of spacecraft construction and therefore need not described. Wall 104 has an openable access hatch 122 that permits equipment module 124 to be placed in the Almaz RRV so as to moveably engage track 112. FIG. 1 shows four equipment modules, three of them are shown engaging track 112 in the spacecraft and one module is in the process of being loaded into the Almaz RRV. Components of track 112 and equipment module 124 are sized to fit through hatch 122. The exact measurements of track and module size are a matter of design choice that can be adjusted to allow an embodiment of the present invention to carry useful payloads within acute angular portion 110 of useful spacecraft volume 102. The angular annular space between the base and the wall is effectively used allowing the greater part of usable volume 102 to be available for use by other payloads, astronauts or for other purposes.

Although illustrations show approximately cube shaped storage modules it should be appreciated that other storage module shapes are also within the scope of the invention, in particular if those shapes take advantage of available space in a spacecraft's interior annular portion. For example, a storage module's outboard side could be curved to follow the shape of the spacecraft wall's interior. Likewise, a storage module's bottom could be shaped to better fit a spacecraft's base.

Although illustrations show annular storage support track that holds a storage module so that the storage module's top and bottom are oriented in a horizontal plane, it should be appreciated that annular storage support track that holds a storage module in a different orientation is within the scope of the invention. For example, annular storage support track could hold a storage module at an angle that takes advantage of available space within a spacecraft's interior annular portion. Also, annular storage support track could hold a storage module at an angle that facilitates mounting and dismounting the storage module. Also, annular storage support track could hold a storage module at an angle that facilitates accessing payload within a storage module. For example, annular storage support track could hold a storage module at an angle that closely aligns with the angle of the spacecraft's interior wall such that the storage module takes better advantage of available space within a spacecraft's interior annular portion and so the storage module can be readily mounted and dismounted by raising the storage module at an angle parallel to the spacecraft's interior wall. Also, annular storage support track that holds a storage module at an angle that closely aligns with the angle of the spacecraft's interior wall may allow better access to the storage modules payload through the storage module's top and payload can be removed from the storage module or inserted into the storage module through the storage module's top by moving the payload upward or downward at an angle approximately the same as the spacecraft's interior wall adjacent to the storage module.

In FIG. 1, functionally, equipment storage modules 124 can be moved along annular track 112 by means of bearings until they are near the hatch for loading and unloading; or moved to a position that is accessible to an astronaut or robotic manipulator. The modules or track may be locked into a fixed launch and landing position by a mechanical lock. These mechanical details are known in the art and will not be described in detail. An embodiment makes efficient use of the acute angle annular space between the spacecraft base and wall that is wasted space now and also allows the equipment and experiment storage modules to be moved around the annular track so the equipment is easily accessible. Wired or wireless data and power connectivity may be supplied as a spacecraft service to the equipment storage modules and their contents in ways well known to those skilled in the art.

Figure 2A:
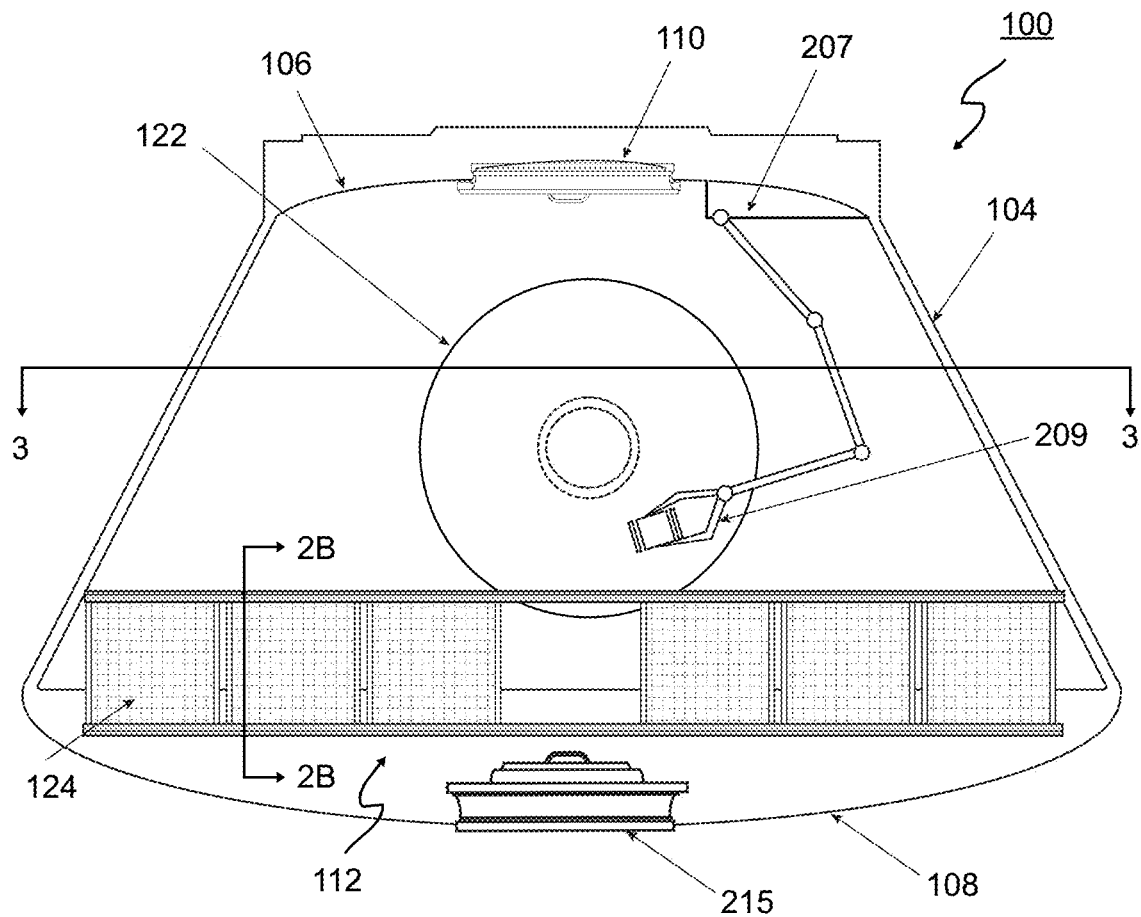
FIG. 2A is a plane view of the embodiment shown in FIG. 1 showing details of the modules used to store cargo.

FIG. 2A shows a plane view of an embodiment of the invention shown in FIG. 1, further illustrating how the embodiment is disposed within Almaz RRV 100. In this and the following figures, like figure numbers indicate like structures. The Almaz capsule diameter is 2788 mm at its base and has a 1565 mm interior wall height. Equipment modules 124 are shown in this embodiment of the invention as cubes 300 mm on a side. As will be shown below, other shapes and sizes of storage modules may be used without departing from the scope of the invention. Almaz RRV 100 has an openable hatch 215 in its base 108 that permits payloads, such as small satellites, to be deployed by ejecting them out of the spacecraft through hatch 215 while spacecraft 100 is in orbit. Spacecraft 100 is shown with an articulated robotic arm system 207 including a mechanical hand 209 which is capable of grasping and moving equipment modules 124 along track 112 while spacecraft 100 is in orbit. Arm 207 and hand 209 may remove a payload from a module, open the rear hatch of the spacecraft and deploy the payload from the Almaz RRV as a free flying satellite. There may be more than one arm and hand and each may be equipped with sensors for touch and video.

Figure 2B:
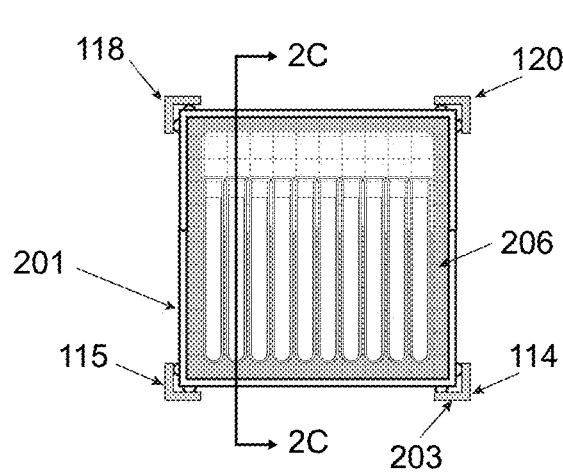
FIG. 2B is a sectional view of the embodiment taken along section lines 2B-2B of FIG. 2A.

FIG. 2B shows a sectional view of the embodiment taken along section line 2B-2B of FIG. 2A, showing how walls 201 and corners 202 of the cubical equipment module fit into the rails of the embodiment's track. In this figure the cubical 300 mm×300 mm storage module is holding up to 100 test tubes that are 25 mm by 250 mm that may contain student experiments 206 in a Styrofoam holder. The embodiment may have a mix of stored cargo and equipment. For example if all the modules held these student experiment tubes, the Almaz capsule could carry over 1,000 student experiments, i.e. several experiments from students from every country, while allowing commercial payloads to use the majority of the interior volume of the space capsule to pay for the flight of the student experiments.

Figure 2C:
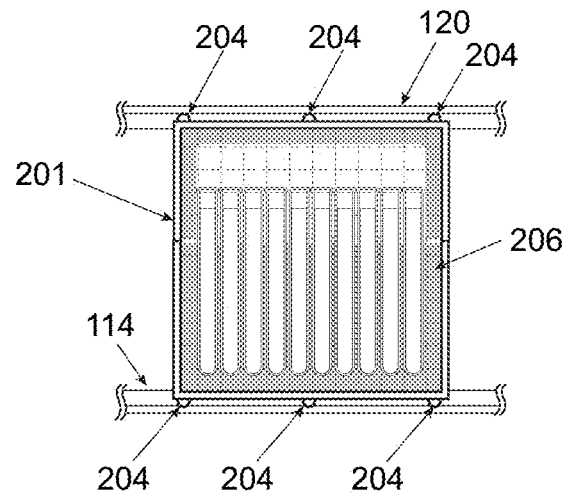
FIG. 2C is a sectional view of the embodiment taken along section lines 2C-2C of FIG. 2B.

FIG. 2c shows a sectional view of the embodiment taken along section lines 2C-2C of FIG. 2B. Roller bearing 204 allow the storage module to move along the track. These bearings may be part of the track system or part of the storage module. The embodiment can function with only one track rail. Four track rails are shown in this figure. It is important to note that the number of rails is a design choice for the specific storage system. The only requirement is that the storage module be able to move around the annular portion of the spacecraft interior volume.

Figure 3:
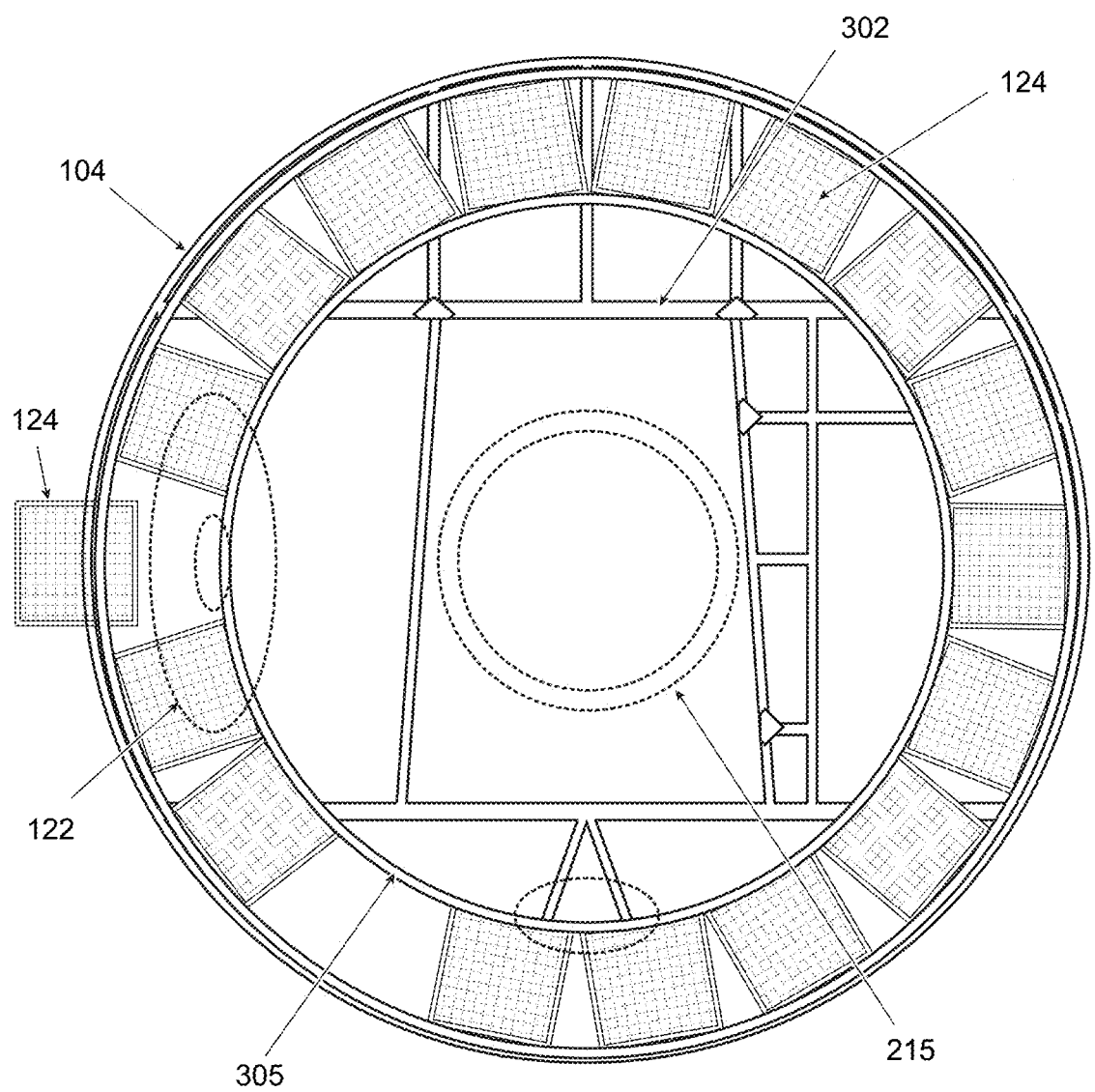
FIG. 3 is a sectional view of the embodiment viewed along section line 3-3 of FIG. 2A showing a top down view of an embodiment within to annular space at the base of a space capsule.

FIG. 3A shows a sectional view an embodiment in Almaz RRV 100 taken along section lines 3A-3A of FIG. 2A. This is a view of the embodiment as seen looking down from the top of the Almaz RRV. It shows how the cubic 300 mm storage modules are annularly proximate wall 104. If this storage geometry is used, then 18 of the removable storage modules will fit within the annular acute angle portion of the capsule's usable volume. Each of these modules could carry up 100 student experiments in 25 mm×250 mm hermetically sealed tubes in a Styrofoam support matrix. Thus this embodiment of the storage system can carry up to 1800 student experiments.

Figure 4:
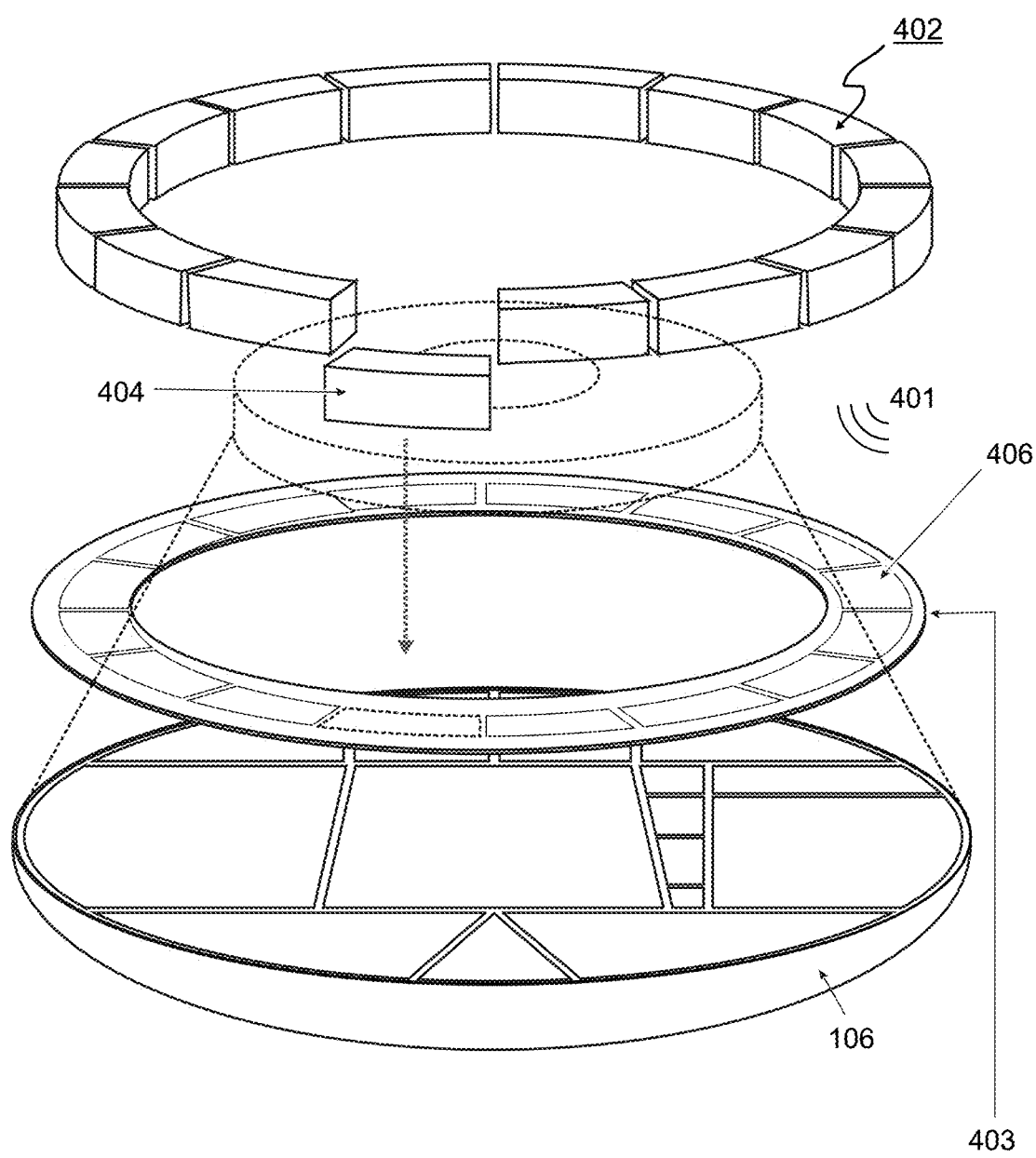
FIG. 4 is an exploded isometric view of a volumetrically efficient embodiment of the present invention within a space capsule that includes power and data connectivity means.

FIG. 4 shows an exploded isometric view of a different embodiment of the present invention wherein experiment modules 402 are curved modules 404 that sit on a supporting ring 406. Modules 404 are 400 mm long and 200 mm deep and they are curved so their geometry is congruent with shape of the acute angle annular portion of the capsule's useful volume. This embodiment is more geometrically efficient than the cubical module discussed above because the cubical modules leaves wasted space near the outer wall of the spacecraft. If desired, electric power may be fed to baseplate 406 by power supply 403. This electric power supply may be connected directly to the modules by conductors, or it may be used to energize induction coils on the baseplate that would transfer power to the modules and the experiments of equipment wirelessly. Radio data transfer system 402 may be a Bluetooth transceiver or Wi-Fi hub that is functionally connected to the equipment modules and experiments by radio frequency data links and also to the data system of the Almaz RRV for telemetry, control and recording of experimental results and equipment storage environmental and status information.

Although certain illustrative embodiments of my invention are described above, many other embodiments of my invention may be made by those skilled in the art without departing from the scope of my invention, which should be limited only by the appended claims and their legal equivalents.

The invention claimed is:

1. A spacecraft onboard equipment and payload storage system comprising:
    a spacecraft having an interior volume, wherein said interior volume comprises an interior annular portion;
    an annular storage support track connected to said spacecraft within said spacecraft's interior annular portion; and
    at least one storage module that is movably connected to said annular storage support track.

2. A spacecraft onboard equipment and payload storage system according to claim 1 wherein said spacecraft comprises a wall and a circular base, wherein said wall is connected to said circular base and said interior annular portion is located near the junction of said wall and said circular base.

3. A spacecraft onboard equipment and payload storage system according to claim 2 wherein said annular storage support track comprises a plurality of rails.

4. A spacecraft onboard equipment and payload storage system according to claim 3 wherein said plurality of rails comprises a lower inboard rail, a lower outboard rail, an upper inboard rail, and an upper outboard rail.

5. A spacecraft onboard equipment and payload storage system according to claim 1 wherein said storage module slidingly engages said annular storage support track.

6. A spacecraft onboard equipment and payload storage system according to claim 1 wherein movable connection between said annular storage support track and said storage module comprises bearings.

7. A spacecraft onboard equipment and payload storage, system according to claim 1 further comprising a mechanical lock that fastens said storage module fixedly to said annular storage support track such that said storage module will not move in relation to said annular storage support track when said mechanical lock is engaged.

8. A spacecraft onboard equipment and payload storage system according to claim 3 wherein at least one rail is fastened to said wall and at least one rail is fastened to said circular base and wherein said storage module has an outboard side proximate to said spacecraft wall wherein said outboard side has a sloped orientation and a curved shape that approximates the sloped orientation and curvature of the spacecraft wall to minimize unused space between said storage module and said spacecraft wall.

9. A spacecraft onboard equipment and payload storage system according to claim 1 further comprising a power source and an electric power bus that transfers power between said power source and said storage module.

10. A spacecraft onboard equipment and payload storage system according to claim 9 wherein said electric power bus comprises an induction coil.

11. A spacecraft onboard equipment and payload storage system according to claim 1 further comprising a radio data transfer system that transfers data between said spacecraft and said storage module.

12. A spacecraft onboard equipment and payload storage system according to claim 11 wherein said radio data transfer system comprises a Bluetooth transceiver.

13. A spacecraft onboard, equipment and payload storage system according to claim 11 wherein said radio data transfer system comprises a WiFi hub.

14. A spacecraft onboard equipment and payload storage system according to claim 1 further comprising a robotic arm system.

15. A spacecraft onboard equipment and payload storage system according to claim 14 wherein said robotic arm system comprises an articulated robotic arm that has a range of motion allowing said robotic arm to cause said storage module to translate along said annular storage support track.

16. A spacecraft onboard equipment and payload storage system according to claim 15 wherein said robotic arm system further comprises a hand capable of accessing and manipulating a payload within said storage module.

17. A spacecraft onboard equipment and payload storage system according to claim 16 wherein said robotic arm system has a range of motion allowing said robotic arm system to remove payload from said storage module.

18. A spacecraft onboard equipment and payload storage system according to claim 16 wherein said robotic arm system has a range of motion allowing said robotic arm system to open a spacecraft hatch.

19. A spacecraft onboard equipment and payload storage system according to claim 16 wherein said robotic arm system has a range of motion allowing said robotic arm system to deploy a payload through a spacecraft hatch.

20. A spacecraft onboard equipment and payload storage system according to claim 8 further comprising:
   a mechanical lock that fastens said storage module fixedly to said annular storage support track such that said storage module will not move in relation to said annular storage support track when said mechanical lock is engaged;
   a power source and an electric power bus that transfers power between said power source and said storage module, wherein said electric power bus comprises an induction coil;
   a radio data transfer system that transfers data between said spacecraft and said storage module; and
   a robotic arm system comprising an articulated robotic arm and hand that has a range of motion allowing said robotic arm system to;
      cause said storage module to translate along said annular storage support track,
      manipulate a payload within said storage module;
      open a spacecraft hatch; and
      deploy a payload through a spacecraft hatch.

* * * * *